E. F. ORNER.
BRAKE.
APPLICATION FILED APR. 23, 1914.
1,154,426. Patented Sept. 21, 1915.
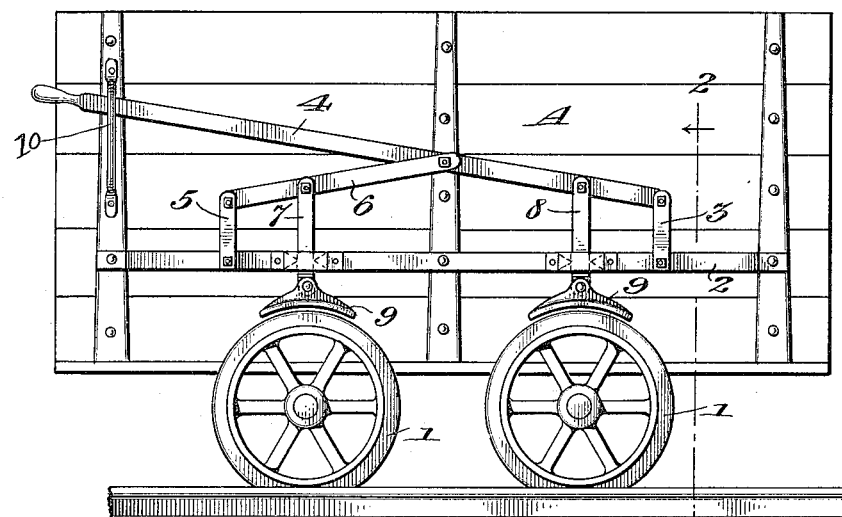
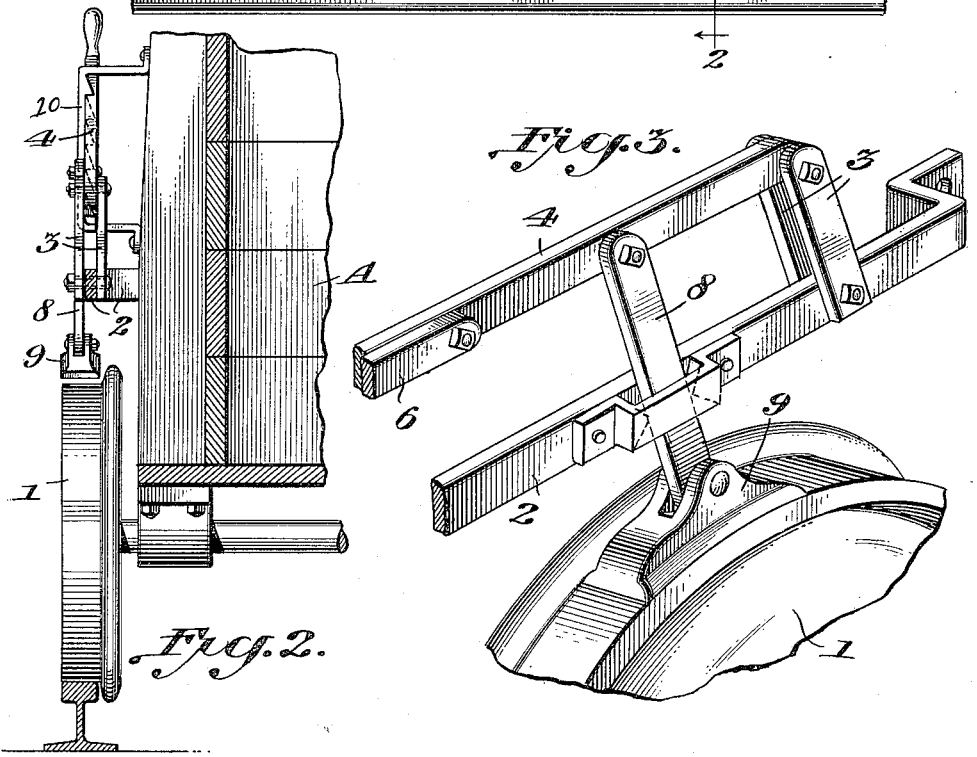

UNITED STATES PATENT OFFICE.

ELLIS F. ORNER, OF GOWEN CITY, PENNSYLVANIA.

BRAKE.

1,154,426.  Specification of Letters Patent.  Patented Sept. 21, 1915.

Application filed April 23, 1914. Serial No. 833,885.

*To all whom it may concern:*

Be it known that I, ELLIS F. ORNER, a citizen of the United States, residing at Gowen City, in the county of Northumberland and State of Pennsylvania, have invented certain new and useful Improvements in Brakes, of which the following is a specification.

This invention relates to an improvement in brakes, and the object is to provide means connected to the side of a car, such as a mine car, for operating the brakes or friction shoes to cause the car to be brought to a stop or govern its speed. The brakes applied to mine cars are operated from the side and the operator grasps the brake lever causing the shoes to be brought into engagement with the wheels of the car, and locks the lever in the desired position for controlling the momentum of the car.

The invention consists of certain novel features of construction and combinations of parts which will be hereinafter described and pointed out in the claims.

In the accompanying drawings: Figure 1 is a view in side elevation showing the invention applied to a car; Fig. 2 is a vertical sectional view on the line 2—2 of Fig. 1; and Fig. 3 is a perspective view showing the position of the levers when in operative position, one of the brake shoes being shown in engagement with the wheel.

A, represents the car body, and 1, 1 are the wheels. Mounted on the car body and extending longitudinally thereof is a bar 2. A post consisting of two parallel members 3, 3, is pivotally connected to the bar 2, to which is pivotally connected a lever 4. A standard 5 is connected to the bar 2, and connected to the standard is a link 6 which has pivotal connection with the lever 4. Connected to the link 6 and lever 4 are shoe links 7 and 8, respectively. The links 7 and 8 are each provided with friction shoes 9. When the lever 4 is moved downwardly the post 3 is caused to move from a vertical position to practically an acute angle. This movement of the lever and post imparts a movement to the links 7 and 8 forcing them downward and bringing the shoes into engagement with the peripheries of the wheels. The links 7 and 8 instead of being forced downwardly in a vertical plane are caused to extend somewhat diagonally thereby bringing the shoes into engagement with the wheels in a manner so that a greater amount of power or force may be imparted to the shoes to cause them to impinge tightly upon the wheels and obtain the greatest braking effect. A toothed bar 10 is connected to the car, and the teeth are adapted to engage the lever for holding it in any of its adjusted positions. The pivotal connection between the links 7 and 8 with the shoes 9, permits the lever 4 and link 6 to impart to the links 7 and 8 a force which could not be imparted by the levers if the links were rigidly connected to the shoes.

I claim:—

1. The combination with a vehicle and wheels thereon, of friction shoes, links connected therewith, two levers pivotally connected at one end to the vehicle, pivotally connected with each other, and pivotally connected to the links, one of said levers of greater length than the other, having a handle whereby it is operated to simultaneously apply the brakes to the wheels.

2. In a brake, the combination with a car body, having wheels thereon, of a post and a standard connected to the car body, levers pivoted to the post and standard and to each other, links pivotally connected to the levers, and friction shoes connected to the links and adapted to be brought into engagement with the wheels upon the actuation of one of the levers.

3. In a brake, the combination with a car body having wheels thereon, of a post, a standard pivotally connected to the car body, levers pivotally connected to the post, a standard, links pivotally connected to the levers and normally held in a vertical position, brake shoes carried by the links adapted to be brought into engagement with the wheels upon the movement of the levers, said levers adapted to impart motion to said links causing them to assume a diagonal position.

In testimony whereof I affix my signature, in the presence of two witnesses.

ELLIS F. ORNER.

Witnesses:
 PETER W. SCHLEIG,
 LILLIE A. SCHLEIG.